(12) United States Patent
Cruz

(10) Patent No.: US 11,791,615 B2
(45) Date of Patent: Oct. 17, 2023

(54) ALTERNATIVE ENERGY INTERFACE, WITH POWER CONTROL SYSTEM, MULTIPLE SOURCE COMBINER, AND ISLANDING

(71) Applicant: Paul M. Cruz, San Diego, CA (US)

(72) Inventor: Paul M. Cruz, San Diego, CA (US)

(73) Assignee: Paul M. Cruz, San Diego, CA (US)

( * ) Notice: Subject to any disclaimer, the term of this patent is extended or adjusted under 35 U.S.C. 154(b) by 381 days.

(21) Appl. No.: 16/852,390

(22) Filed: Apr. 17, 2020

(65) Prior Publication Data

US 2021/0028613 A1 Jan. 28, 2021

Related U.S. Application Data

(60) Provisional application No. 62/919,107, filed on Feb. 25, 2019.

(51) Int. Cl.
| | |
|---|---|
| *H02H 3/08* | (2006.01) |
| *H02H 9/02* | (2006.01) |
| *H02S 40/34* | (2014.01) |
| *H02J 3/46* | (2006.01) |
| *H02B 1/20* | (2006.01) |

(52) U.S. Cl.
CPC ................ *H02H 3/08* (2013.01); *H02B 1/20* (2013.01); *H02J 3/46* (2013.01); *H02S 40/34* (2014.12)

(58) Field of Classification Search
CPC ............... H02H 3/08; H02J 3/46; H02S 40/34
USPC ......................................................... 361/93.5
See application file for complete search history.

(56) References Cited

U.S. PATENT DOCUMENTS

| | | | |
|---|---|---|---|
| 5,369,356 A | 11/1994 | Kinney et al. | |
| 5,590,179 A | * 12/1996 | Shincovich | ............ G01R 22/00 340/870.03 |
| 6,411,078 B1 | 6/2002 | Nakagawa et al. | |

(Continued)

FOREIGN PATENT DOCUMENTS

| | | |
|---|---|---|
| GB | 2394130 A | 4/2004 |
| JP | 5497115 B2 | 3/2014 |
| RU | 2475923 C2 | 2/2013 |

*Primary Examiner* — Jared Fureman
*Assistant Examiner* — Lucy M Thomas
(74) *Attorney, Agent, or Firm* — Kunzler Bean & Adamson; Bruce R. Needham

(57) ABSTRACT

This disclosure provides systems, methods, and apparatuses for a power control system device housed in a subpanel, that allows for multiple alternative energy inputs as well as providing an islanding feature, which allows a homeowner to receive alternative energy power when the utility power is lost. For example, in a system that includes an electrical service panel main with a main circuit breaker that is connected directly to a utility electrical source, which may have one or more secondary circuit breakers that back-feeds current from an alternative energy source, there is provided an apparatus that: monitors current from both circuit breakers and prevents excess power from overheating the service panel and/or the wiring to the main circuit breaker; may have multiple spaces for circuit breakers that may be connected to multiple alternative energy sources; and may continue to feed specific loads to the home when utility power is lost and one or more alternative energy sources are available.

15 Claims, 17 Drawing Sheets

(56) References Cited

U.S. PATENT DOCUMENTS

| | | | |
|---|---|---|---|
| 6,901,572 B1 * | 5/2005 | Dougherty | G06F 30/34 |
| | | | 713/300 |
| 7,174,261 B2 * | 2/2007 | Gunn | G01R 15/185 |
| | | | 702/62 |
| 7,248,978 B2 | 7/2007 | Ransom | |
| 7,977,818 B1 | 7/2011 | Wahl | |
| 8,684,758 B2 | 4/2014 | Gharabegian et al. | |
| 8,700,224 B2 | 4/2014 | Mathiowetz | |
| 8,901,411 B2 | 12/2014 | Liu et al. | |
| 9,728,972 B2 | 8/2017 | Cruz | |
| 9,964,982 B1 * | 5/2018 | Nguyen | H04L 67/10 |
| 10,283,955 B2 | 5/2019 | Cruz | |
| 2012/0326518 A1 * | 12/2012 | Rusch | H02J 9/062 |
| | | | 307/80 |
| 2014/0265573 A1 * | 9/2014 | Kreutzman | F24H 1/0027 |
| | | | 307/31 |
| 2019/0081458 A1 * | 3/2019 | Lapushner | H02B 1/03 |

* cited by examiner

ALTERNATIVE ENERGY INTERFACE, WITH POWER CONTROL SYSTEM, MULTIPLE SOURCE COMBINER, AND ISLANDING

CROSS-REFERENCES TO RELATED APPLICATIONS

This application claims the benefit of U.S. Provisional Application No. 62/919,107, filed Feb. 25, 2019, which is hereby expressly incorporated by reference herein.

FIELD OF THE INVENTION

The present invention relates generally to power control systems (PCS), as defined by Section 705.13 of the National Electrical Code (NEC). More specifically, the disclosure is directed to an external interface apparatus for the connection and control of multiple alternative energy power sources, via the PCS, that are connected to a primary power source, such as the electric utility.

BACKGROUND OF THE INVENTION

During the last 100+ years, the typical residential main electrical service panel (service panel) houses fuses and/or circuit breakers, that provide the overcurrent protection and circuit distribution, for the wiring within a home.

These service panels generally contain two or three bus bars (two for single-phase and three for 3-phase systems), and a neutral bar connected to ground. Each of the bus bars, fabricated of either aluminum or copper, are energized by the utility at 120 volts (V) to ground (or neutral) and 240 V measured from bus-to-bus (phase-to-phase). The energized bus bars are designed to carry large amounts of current. This current is reduced for use in the home by lower ampacity circuit breakers that attach to the bus bars. These circuit breakers distribute 120 V and 240 V circuits throughout the home.

Excluding today's longer enclosures that accommodate a greater number of overcurrent devices, and the almost exclusive use of circuit breakers (instead of fuses), little has changed in service panels over the last 100+ years; however, what these circuit breakers are connected to has changed dramatically. While the additional electrical devices and equipment used throughout the home utilize the majority of the increased number of circuit breakers, the newest addition is for connection of renewable sources of energy or "alternative energy" (AE) such as solar, wind, engine generators, battery storage, etc., with each AE source generally requiring two adjacent circuit breaker positions.

With the effects of global warming continuing to intensify, AE sources continue to evolve, providing homeowners with improved renewable energy technologies, which help reduce their carbon footprint. AE sources are generally connected to a circuit breaker, which is connected ("back-fed") to the service panel bus bars, that connects to the utility grid (supplying the utility grid with AE power not being used by the home).

"Back-fed" is a term used in the electrical industry to describe the direction of current flow through the circuit breaker. Normally, a branch circuit breaker (i.e. a circuit breaker connected to the service panel bus bars) provides current to the connected load. In the case of a back-fed circuit breaker, the current is flowing in the opposite direction of energy coming from the utility grid (i.e. to the service panel bus bars). Back-fed current coming from AE sources flows to the bus bars (and to the utility grid), through a home's service panel bus bars via a back-fed circuit breaker.

This AE back-fed connection can pose several electrical safety issues, and over the years, the National Electrical Code (NEC), has had to revise its installation rules and safety certification requirements. These electrical issues and existing limitations include (in no particular order): utility worker safety, the inability of the AE source(s) to continue to provide power to the residence during a utility outage, overheating of the service panel, and service panel replacement(s) cost(s), which typically occur each time AE is added to an existing AE system.

Worker Safety

As most AE systems installed today are electrically connected to the same service panel as the electric utility, excess AE power not being used by the home is back-fed to the utility grid. These AE connections can create significant safety concerns, if allowed to energize the utility grid that was otherwise thought to be shutdown. For worker safety, Article 690 of the 1984 NEC was introduced requiring any AE system to be automatically disconnected (isolated) electrically from the utility grid when utility power is unavailable for any reason (either by accidental unscheduled outages, scheduled rolling blackouts, or scheduled mass shutdowns). By isolating the AE connections, the utility workers repairing the grid can be certain that no sources are energizing the system while they are exposed to uninsulated current-carrying wires or equipment.

Islanding

Recently in California, high winds caused utility transmission wires to contact one another, causing electrical sparks that due to hot and dry conditions, started massive wildfires. Scheduled electrical blackouts in these areas reduced wildfires, but also caused a variety of power outage issues, including the non-operation of health equipment, perishables losses, and communications losses. In anticipation for these and other related issues, the NEC was revised in 2017, to allow AE to continue to supply power to the premise wiring when isolated from the grid, called "islanding". While special equipment is required, when provided it will sense the utility outage, isolate the AE from the utility grid connected to the home's service panel, and depending on the amount of energy available, can connect the AE to some (or all) circuits of the home, and continue to provide power to the home that would otherwise shut down automatically with a utility outage.

Service Panel Overheating

A traditional service panel has a single main circuit breaker connected between it and the utility power (via copper or aluminum wires), which helps to protect the service panel from hazards caused by overheating. Once the current passing through the main circuit breaker exceeds the main circuit breaker ampacity rating (marking on the circuit breaker handle) for a predetermined length of time, the main contacts of the circuit breaker will automatically open, thereby shutting down power to the entire service panel.

As residential installations of AE power sources increased, the NEC requirements evolved to address the connections inside of the service panel. In 1987, Section 690-61 was revised to limit the additional back-fed current that could be supplied by the AE to 20% of the value of either the service panel bus bar ampacity, or the service panel main circuit breaker wire ampacity.

In 2020, Article 705 of the NEC (now covering all AE connections to the grid) was revised to allow more than the 20% additional current limitation mentioned above, when specific equipment was provided. The specific equipment is defined by new Section 705.13, requiring a device identified as a Power Control Systems (PCS). The NEC requires that the PCS monitor both the AE and utility current to the service panel bus bars, and when the total current of the sources exceeds the ampere rating of the service panel bus bars or the main circuit breaker wiring, the transmission of AE current must be reduced to a value equal to or less than the ampere rating of the service panel bus bars or the main circuit breaker wiring.

Service Panel Upgrade(s)

When electrical regulations limited the additional current to 20% of the service panel rating, replacement and upgrade of the service panel was often necessary, as the amount of AE power generated would not provide the payback to become cost-effective for the homeowner. However, the additional cost of a panel upgrade (including the cost of cosmetic and/or structural repairs to the building, and at least one day added to the installation time) could increase the cost of the solar installation by 10% or more, thereby putting solar out of the reach of many homeowners. In many cases, the PCS system mentioned above can help solve this problem, eliminating the need to replace or upgrade the service panel.

Multiple AE Systems

While changes to the NEC attempted to allow for the continued use of the existing panel (e.g., the PCS mentioned above), the installation of multiple AE systems cannot be completed without upgrading and replacing the existing service panel, since most panels were already filled with previously installed circuit breakers needed to accommodate the home's branch circuit loads.

Multiple AE systems installed in a single residence can add further space issues inside of the service panel, that the PCS cannot solve. For example, installing two AE systems can only be completed if there is enough space for two 2-pole circuit breakers, and since older service panels are generally smaller in size, the number of open circuit breaker spaces are very limited, and often nonexistent, as each space is already filled with a circuit breaker feeding a branch circuit. In this case, a service panel upgrade would be required. Service panel replacement remains a lingering problem with solar installations, where electrical distribution equipment has not evolved at the pace of solar technologies, allowing for easy connection of new/or additional AE sources to the existing system.

The difficulties for grid connected AE installations, due to time and expense for the installation of presently available equipment (in accordance with NEC requirements), continues to deter many installations. Installers as well as homeowners continue to search for new technologies and equipment to lower their equipment costs and installation times, and to allow for expansion of AE systems that can be installed. The present invention is intended to address these many outdated obstacles, by providing an AE interface device that exists independently, external to the service panel, that allows for multiple connections of AE devices, and eliminates the need to replace or upgrade the service panel with each installation or upgrade.

SUMMARY OF THE INVENTION

The present invention relates generally to power control systems (PCS), as defined by Section 705.13 of the National Electrical Code (NEC). More specifically, the disclosure is directed to an external interface apparatus for the connection and control of multiple alternative energy power sources, via the PCS, that are connected to a primary power source, such as the electric utility.

Another aspect of the present disclosure provides an apparatus for preventing alternative energy current back-feeding the primary source, when the primary source is lost for any reason (accidental, or scheduled and unscheduled blackouts, etc.). The apparatus may include a means for monitoring the voltage of the primary power source; means for preventing the back-feed of power from the alternative energy power source to the primary power source via opening the electrically operated contacts in the secondary, when the primary source is lost.

Another aspect of the present disclosure provides an apparatus that may also accommodate multiple alternative energy power sources external to the main service panel. The apparatus may include an enclosure with AE back-fed circuit breakers connected to bus bars that are in turn connected to electrically operated contacts, that may be connected to a circuit breaker located in the main service panel. The back-fed circuit breakers may be connected to multiple alternative energy sources by including additional AE circuit breaker spaces. The device combines the output of all the connected alternative energy sources together, to act as a single source, and may be connected to the main electrical service panel.

Another aspect of the present disclosure provides an apparatus that may also accommodate multiple circuit breakers intended to "island" the residence and feed specific branch circuits in the home, when utility power is lost for any reason. Today most equipment shuts down all AE power when utility power is lost. The apparatus may include: a means for monitoring the voltage and/or current of the primary power source; a means for isolating the alternative power source from the primary power source via opening the electrically operated contacts in the secondary; means to provide a 60 Hz signal to allow the alternative energy source to function; and may include multiple circuit breakers to energize and protect the connected residential circuits in the home.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
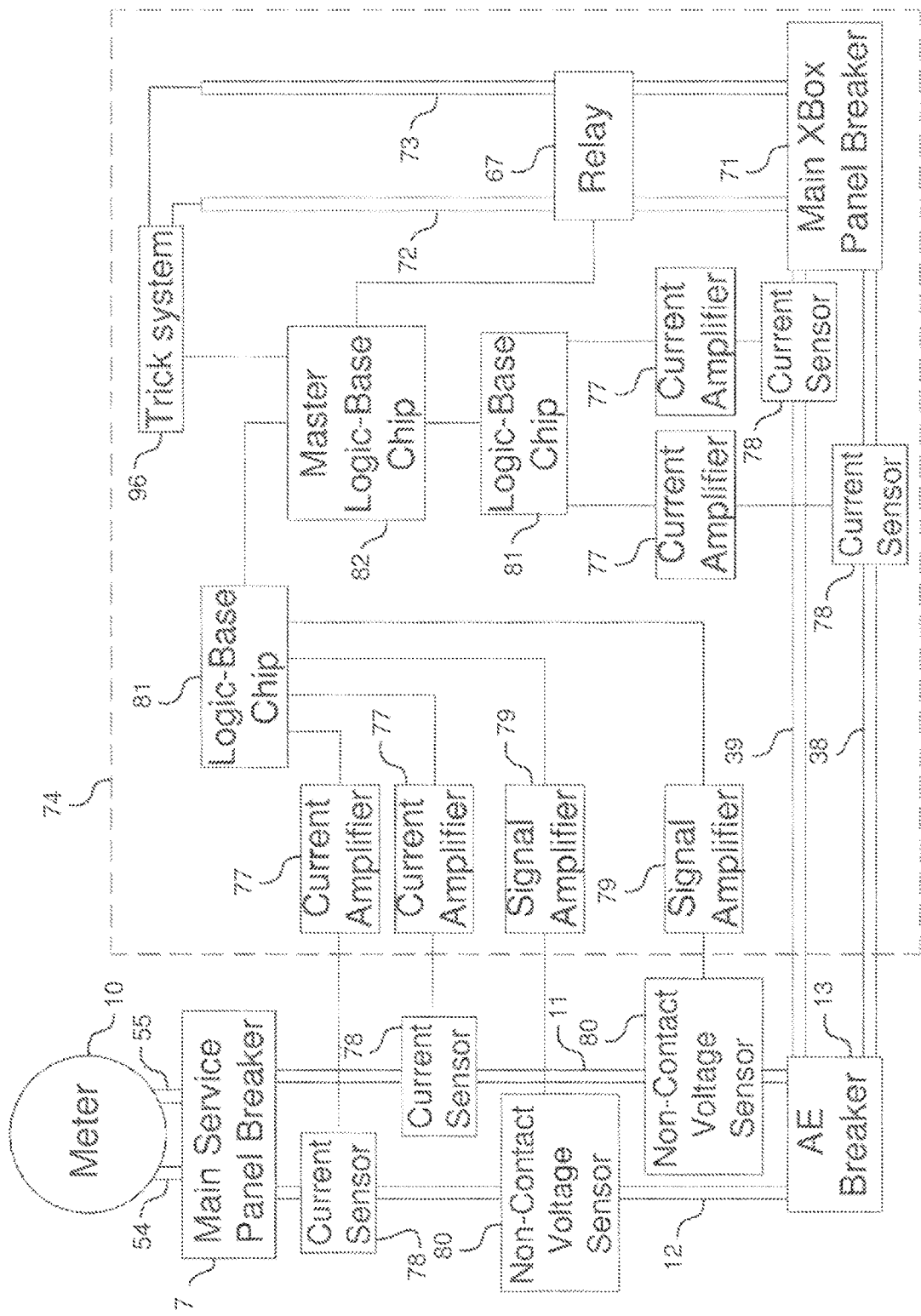
FIG. 1 is a schematic block diagram illustrating a system for an alternative energy interface, according to various embodiments.

The detailed description set forth below, in connection with the appended drawings, is intended as a description of embodiments of the invention and is not intended to represent the only embodiments in which the invention may be provided. The detailed description includes specific details for the purpose of providing a thorough understanding of the different embodiments of the invention. In some instances, some devices are shown in block diagram form.

The present invention is directed to an innovative interface electrical pane! that can: connect multiple alternative energy (AE) power sources, such as solar panels, wind turbines and the like, into a single power source connected to the utility grid through a back-fed circuit breaker connected directly to the bus bars of the main electrical service panel (service panel); control the amount of current sent to the service pane! with a power control system (PCS); and may contain a programmable controller that allows an "islanding" function that is intended to allow power to be delivered to the home during a utility power outage. The present invention may contain a pair of bus bars that can accommodate multiple AE sources through back-fed circuit breakers, intended to combine the total current provided by the AE sources, and transfer the current to the utility electrical grid via an integral main circuit breaker connected to the AE bus bars as a single source. The combined current is transferred through the device main circuit breaker, connected to the AE bus bars and to the utility grid, connected through feeder wires to the service pane! via a back-fed circuit breaker connected directly to the service panel bus bars.

In a related aspect, the output of the combined AE current may be connected to another set of bus bars, intended to connect circuit breakers to feed a specific portion of the branch circuits throughout the residence, with excess current not feeding the branch circuits flowing through the bus bars to the present invention's electrically operated contacts and lastly, the device main circuit breaker for delivery to the service panel.

The present invention is also directed to a Power Control System (PCS) device, that will limit the current that can be provided to the service panel, by monitoring the current of both the utility and the output of the present invention. Monitoring may be completed either with separate CTs coupled to both the service panel main wires and a separate set of CTs coupled to the output wires of the present invention, or a single CT placed in the main electrical service panel with both outputs passing through the CT. In either method, the integral wires of the CTs may be connected to a controller circuit, that may include a set of CTs coupled to the two primary power source feed wires, between the primary power source and the primary main circuit breaker, with integral conductors carrying the monitored primary current from the primary power source to the controller circuit, that may be connected to a transducer connected to the relay connected to the invention main circuit breaker. This relay electrically isolates the invention from the primary power source in the event the additive current of the primary and secondary sources exceeds a predetermined level. Additionally, the present invention contains an apparatus to monitor the primary circuit voltage, control voltage (if provided), and integral CT wiring connections. As required by Section 705.13 of the National Electrical Code (NEC), the PCS will also open the relay when there is: 1) loss of the primary power, 2) loss of control voltage (if present), or 3) loss of any CT connection.

Another feature of the present invention allows the home's AE electrical system to become a "microgrid system" and isolate or "island" from the utility grid, and provide AE power to energize branch circuits of the home when the electric utility power is unavailable. The NEC requires any interactive inverter (an inverter designed to connect to the electric utility grid) to automatically disconnect from the grid when one or more phases of the grid opens. When this occurs, neither the utility nor the AE is generally available to energize the residence unless a separate apparatus is installed within the home's electrical distribution system, that allows the islanding function to occur.

The present device may contain an apparatus that monitors the voltage of each phase of the utility and when either (or both) phase(s) are lost, opens a relay that electrically isolates the device from the utility, and after a predetermined delay, energizes an oscillator apparatus that provides a 60 Hz sinusoidal electrical wave at 120 V to the AE combiner bus bars. When each of the AE inverters receive the oscillator signal, they respond as if the grid voltage has returned and begin their individual startup sequences to synchronize to the voltage wave, and again provide power to AE combiner bus bars.

In a related aspect, each AE source may be connected to electrically operated circuit breakers, that may be connected to one or more logic controllers, and may be connected to multiple current transformers (CTs) and voltage sensors, in order to monitor the AE and utility power sources. During a utility power outage, the present invention can automatically be put in islanding mode, when programmed to do so, by electrically isolating the branch circuit distribution bus bars from the utility, by opening a relay connected to the main breaker of the present invention, energizing an oscillator circuit or grid type source (e.g., battery backup, engine generator, etc.) that provides a sine wave mimicking the electric grid, which thereby energizes the AE inverter(s), to begin feeding current back to the AE bus bars of the invention. When in islanding mode, if the current being drawn by the branch circuit distribution is less than the amount of current being provided by the AE, the pre-programmed logic controllers may turn off specific AE sources to match the amount of current required by the residence.

FIG. 1 illustrates an embodiment that describes one or more aspects of the present invention 74. The present invention may include one or more logic chips 81 that will measure inputs from current sensors 78 and voltage sensors 80, and may pass their signals through current amplifiers 77 and signal amplifiers 79 respectively, to determine when there is: 1) loss of the primary voltage in either or both phases; 2) loss of control voltage to logic chips 81, 82; or 3) loss of any current sensor 78 output connection. When any of these events occur, the master logic-based chip 82 will signal the relay 67 to open its contacts, thus electrically isolating the device 74 from the service panel. The present invention may include a set of CTs coupled to the main power source wires 54 (A phase) and a main power source 55 (B phase), that are ultimately connected to the utility electrical meter.

Figure 2:
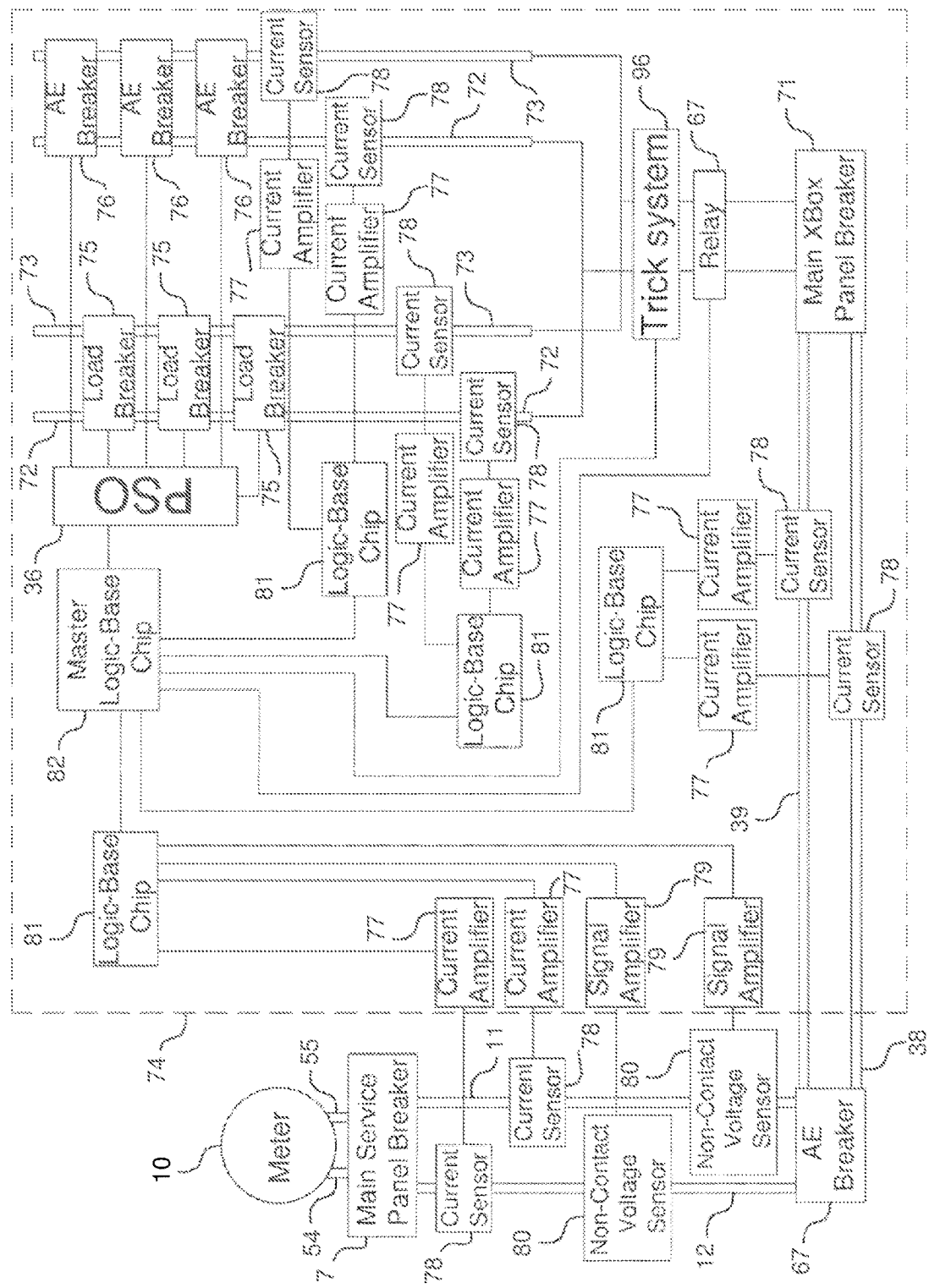
FIG. 2 is a schematic block diagram illustrating another system for an alternative energy interface, according to various embodiments.

FIG. 2 illustrates an embodiment that describes one or more aspects of the present invention 74. The present invention may include one or more pairs of bus bars, with each pair having one bus bar carrying the current of A phase 72, and one bus bar carrying the current of B phase 73, a main circuit breaker 71 connected to the bus bars, and a number of one and two-pole circuit breakers 75 to feed branch circuits throughout the home. The present invention may also include a grounding bar and a neutral bus bar (also known as the common bus).

Another pair of bus bars 72, 73 may be used to combine the current from two or more AE power sources, and transfer this current as a single source to the service panel via the invention main circuit breaker 71 and/or to load circuit breakers 75 connected to branch circuits through out the residence.

The present invention may also contain an apparatus with: voltage sensors 80 and logic chips 81 that may be connected through amplifiers 79 to monitor each phase wire connected to the main circuit breaker of the service panel. The voltage sensor monitoring circuit is connected to one or more logic chips that control the relay 67 and can electrically isolate the invention from the service panel in the event utility power is lost. After a predetermined delay, the logic chip will energize an oscillator circuit 96 that will provide a sinusoidal signal to simulate the grid and allow the AE inverters to begin their startup sequence, and continue to provide AE current to the load circuit breakers 75.

Each of the circuit breakers used in the present invention, whether a main circuit breaker or a branch circuit breaker may be used as a suitable electrical safety device designed to protect an electrical circuit from damage caused by an overload or short circuit, by automatically opening its contacts in response to detecting an overload or short circuit condition.

In the embodiment of FIG. 2, there are shown snap-on or rigid current sensing relays 78 that comprise of current monitoring probes with integral output wires or leads. The current monitoring probes may be coupled to the main utility power source wires 54, 55 and the invention main circuit breaker 71. The probes may be coupled to the AE relay 67 via one or more logic controllers 81,82. In this way, for example, the probes are measuring the magnitude of the current through the wires, and one or more logic controllers measuring the current of both the service panel main circuit breaker and the invention main circuit breaker. If the additive magnitude of the current in both main breakers exceeds a predetermined level, then the master logic controller 82 will signal the relay 67 connected to the invention main circuit breaker 71 to open, electrically isolating the invention 74 from the service panel.

It is noted that the invention may contain an apparatus in order to be fail-safe. For example, if any monitoring wire breaks or becomes disconnected such that there is no signal from the monitoring probes, then the master logic controller 82 will signal the relay 67 connected to the device main circuit breaker 71 to open (turned to the off position), disconnecting the AE power from the service panel. The relay 67 will also open if the control power to the logic chips is lost for any reason.

When the PCS functionality is provided, the total current flowing to the service panel main circuit breaker and AE main circuit breaker may be monitored in numerous ways. For example, the total amperage may be monitored electronically via thermal electric and/or electromagnetic sensors (and/or transducers). In another example, the total amperage may be monitored mechanically via mechanical magnetic and/or thermal mechanical sensors (and/or transducers). In still another example, the total amperage may be monitored based on heat breaking down magnetics, via thermal electric and/or electromagnetic sensors (and/or transducers).

If the combined current from the alternative energy and the grid exceed the maximum bus bar rating of the main service panel, the master logic controller 82 of the present invention can be programmed to either: 1) shut down the combined alternative energy sources with the use of double-pole magnetic relay 67 or an electrically operated circuit breaker, or 2) it can shut down each of the AE sources independently with the use of electrically operated circuit breakers 76 in a predetermined fashion.

Any suitable sensor and/or transducer, which may be collectively referred to herein as sensor(s), may be used to monitor the total current of the sources. For example, the sensor(s) may include: (i) a Hall effect integrated circuit (IC) sensor; (ii) a transfer or current clamp meter (suitable for AC current only); (iii) a fluxgate transformer (suitable for AC and/or DC current); (iv) a resistor associated with a voltage that is directly proportional to the current through the resistor; (v) a fiber-optic sensor that uses an interferometer to measure the phase change in light caused by a magnetic field; and/or (vi) a Rogowski coil or device measuring AC or high speed current pulses.

Figure 3:
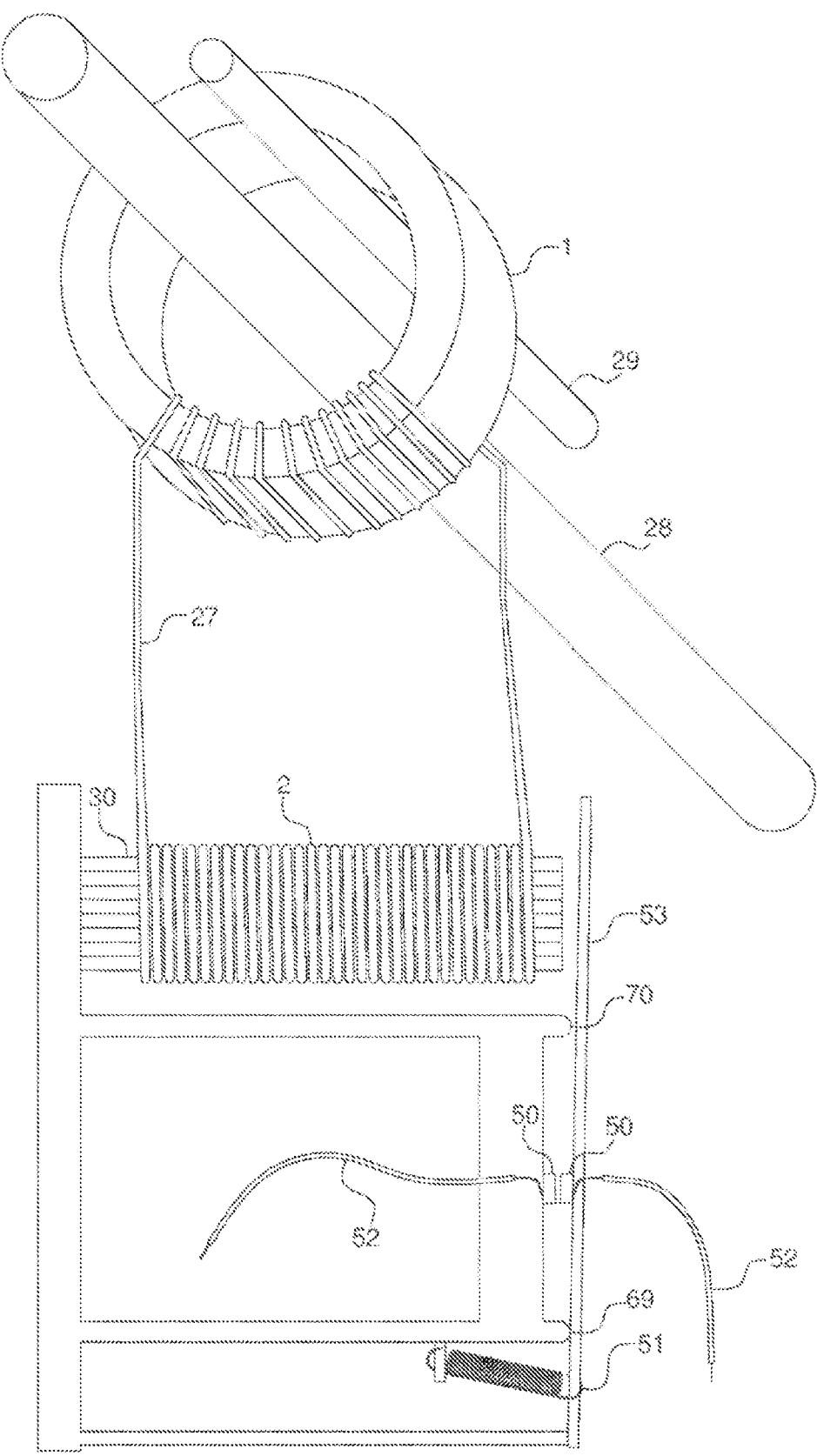
FIG. 3 is a diagram illustrating a solid core dual pivot Current Transformer (CT) with no current flowing through wires passing through the CT, according to various embodiments.

FIG. 3 shows a solid core dual pivot Current Transformer (CT) with no current flowing through wires 28, 29 passing through the CT. The dual pivot CT has three distinct operations: 1) fully disconnected, i.e., no current is flowing and the contacts 50 are open; 2) a minimal amount of current is flowing, and the contacts 50 are closed; and 3) a magnitude of current that exceeds a predetermined level is flowing, causing both contacts 50 to open.

The thicker wire 28 is coming from the utility to the main breaker 7 of the service panel, and the smaller wire 29 is routed from the present invention's output before connection to the alternative energy circuit breaker 13 in the main service panel. Both wires are routed through the same CT to give the sum of the total current from the produced alternative energy source plus the utility. This is the total amount of current being used by the residence that is being carried by the main service panels bus bars.

Figure 4:
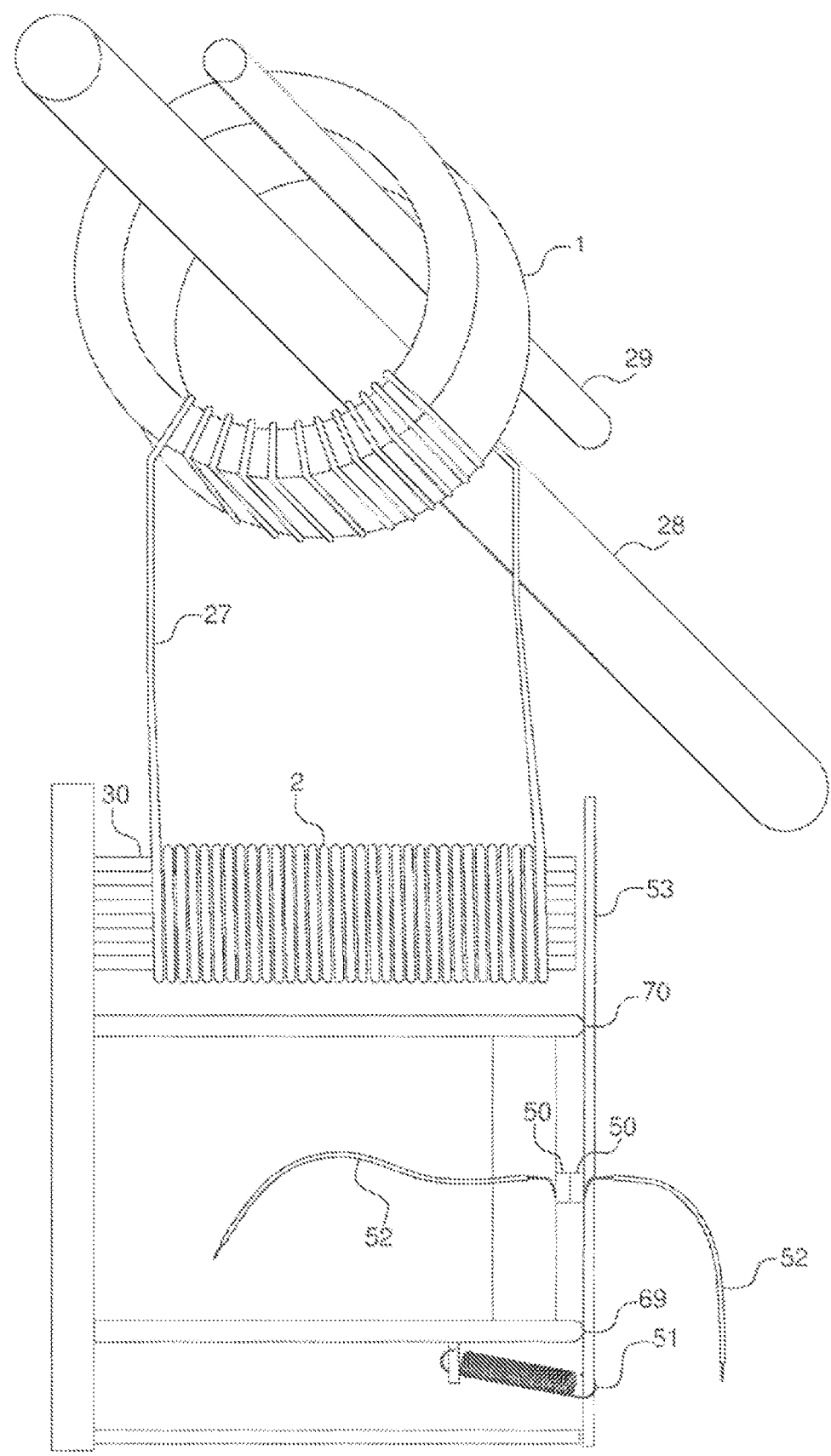
FIG. 4 is a diagram illustrating a solid core dual pivot CT with current flowing through wires passing through the CT where the current is less than a predetermined value, according to various embodiments.

FIG. 4 illustrates the second operation, when there is just enough current (minimum of 0.1 amps) running through the magnetic core 1 creating enough magnetic field through wire 42 wrapped around the laminated rod 30 forcing down pivot arm 53 and touching pivot 70 and engaging contacts 50.

Figure 5:
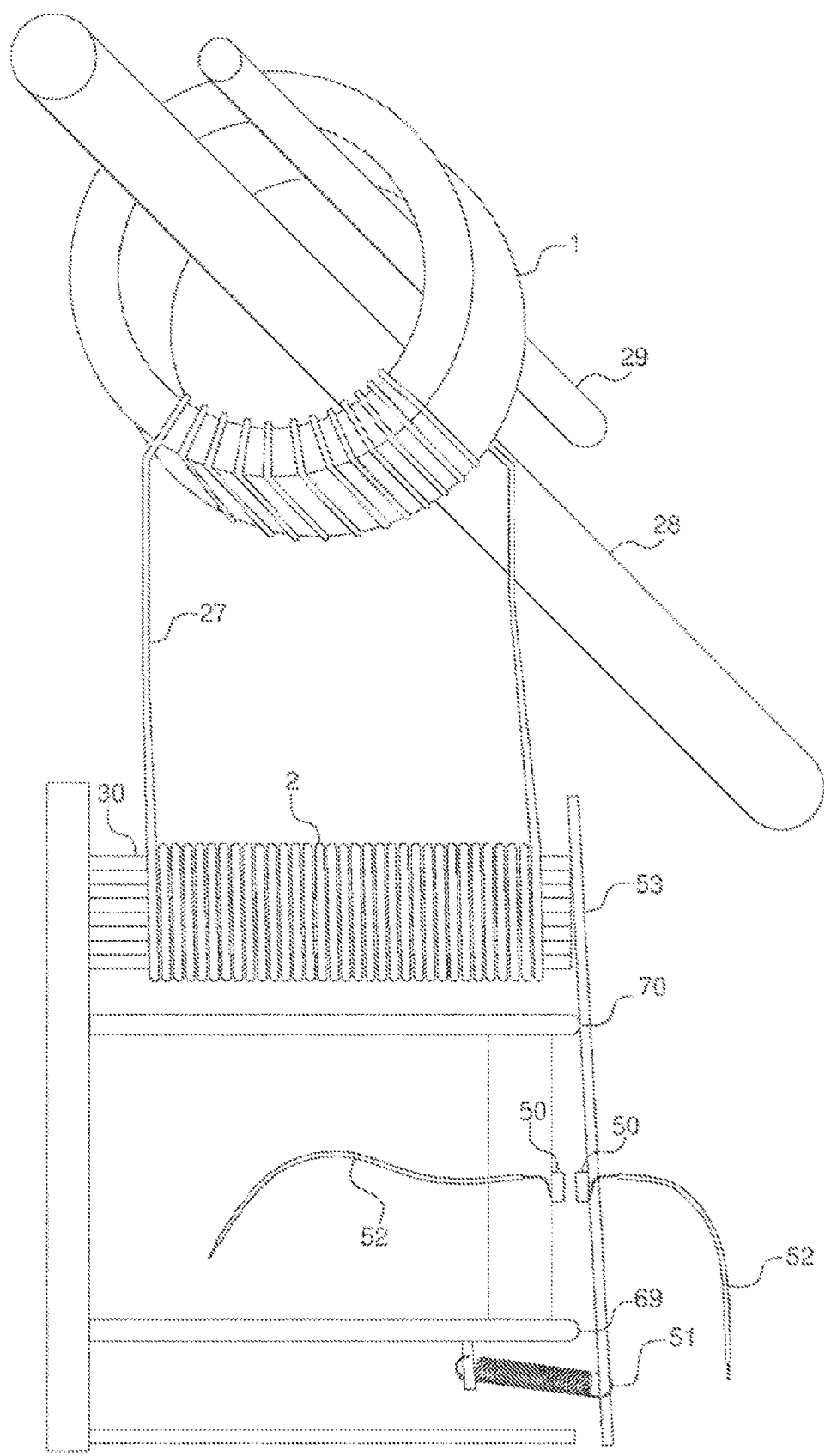
FIG. 5 is a diagram illustrating a solid core dual pivot CT with current flowing through wires passing through the CT where the current is greater than a predetermined value, according to various embodiments.

FIG. 5 illustrates the third operation, this is when the total current exceeds a predetermined value, thereby producing a magnetic field strong enough to engage laminated core 30 and pull the pivot arm 53, disconnecting contacts 50. Each CT relay will have a preset limit depending on the service panel bus bar rating.

Figure 6:
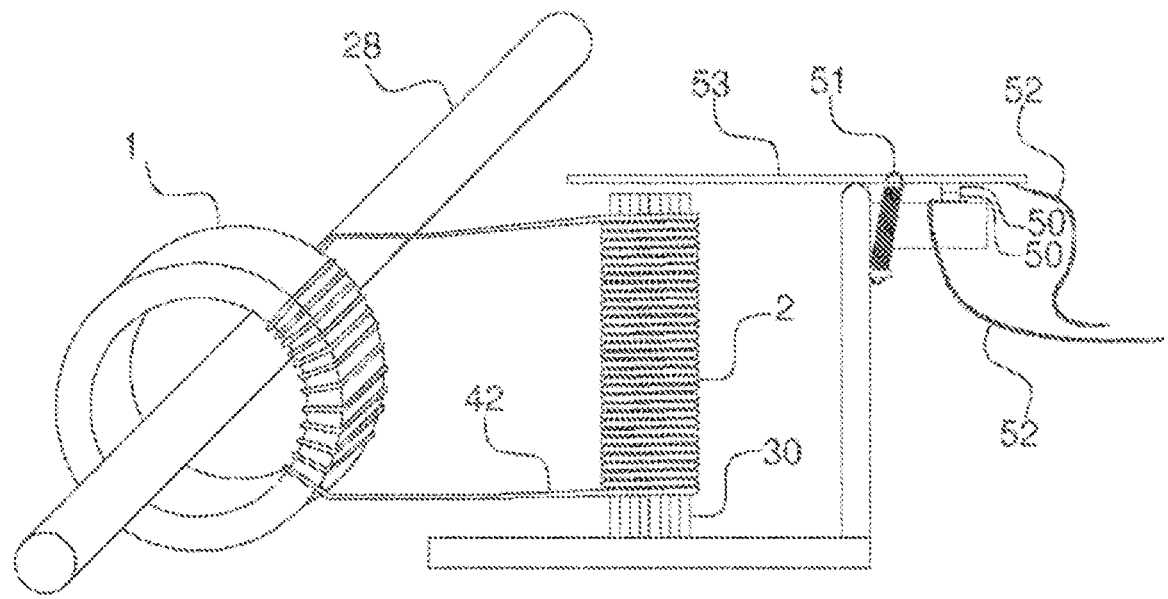
FIG. 6 is a diagram illustrating a solid core single pivot CT with current flowing through wires passing through the CT where the current is less than a predetermined value, according to various embodiments.

FIG. 6 illustrates a current transformer (CT) relay. When current flows from the utility power wire (28) to the main panel's main breaker power it passes through core (1) where a magnetic field is collected by core (1) and sent to magnetic core (30) via wire (42) which is wound (2) around magnetic core (30) transferring the electromagnetic power from magnetic core (1) to magnetic core (30). When a pre-set amperage is met or exceeded, the spring (51) connected to the metal lever (53) pulls the metal lever (53) down thereby disengaging contacts (50) from one another, thus killing the looped power via wire (52), disconnecting the flow of alternative energy power to the grid.

Figure 7:
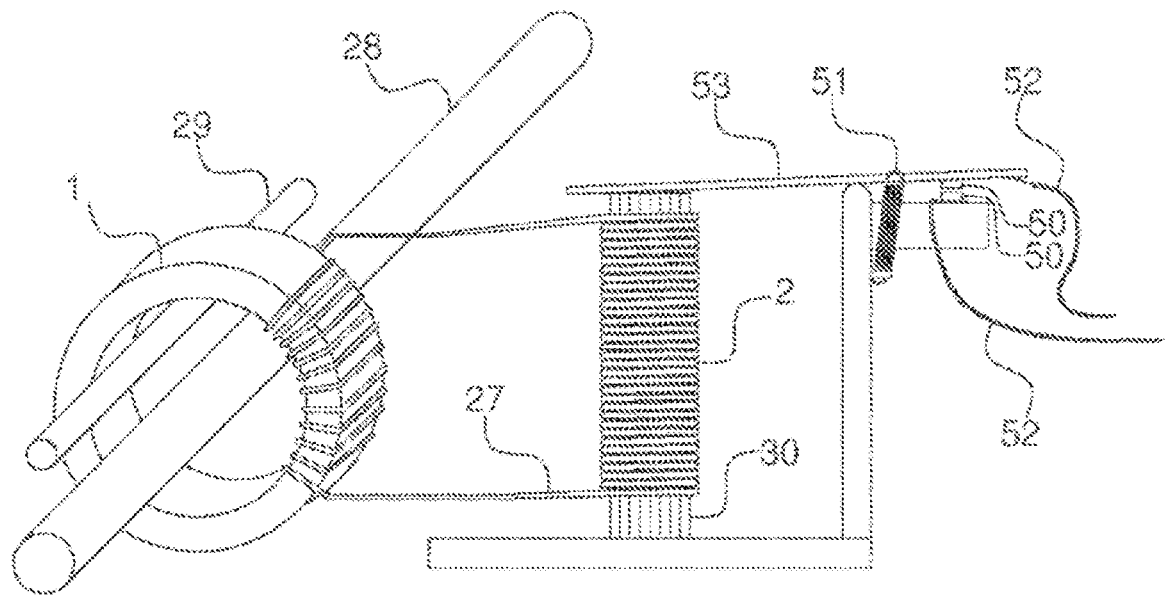
FIG. 7 is a diagram illustrating a solid core single pivot CT with current flowing through wires passing through the CT where the current is greater than a predetermined value, according to various embodiments.

FIG. 7 illustrates a current transformer (CT) relay during an overcurrent event. When current flows from utility power wire (28), to the main panel breaker it passes through core (1), and alternative energy wire (29) also passes through core (1) so that the sum of the total current is sent though magnetic core (30) via wire (27) which is wound (2) around magnetic core (30), transferring the electromagnetic power from magnetic core (1) to magnetic core (30). When a pre-set amperage is met or exceeded, the metal lever (53) is pulled down by the electromagnetic power from magnetic core (30), disengaging contacts (50) from one another, thus killing the looped power via wire (52), disconnecting the flow of alternative energy power to the grid.

Figure 8:
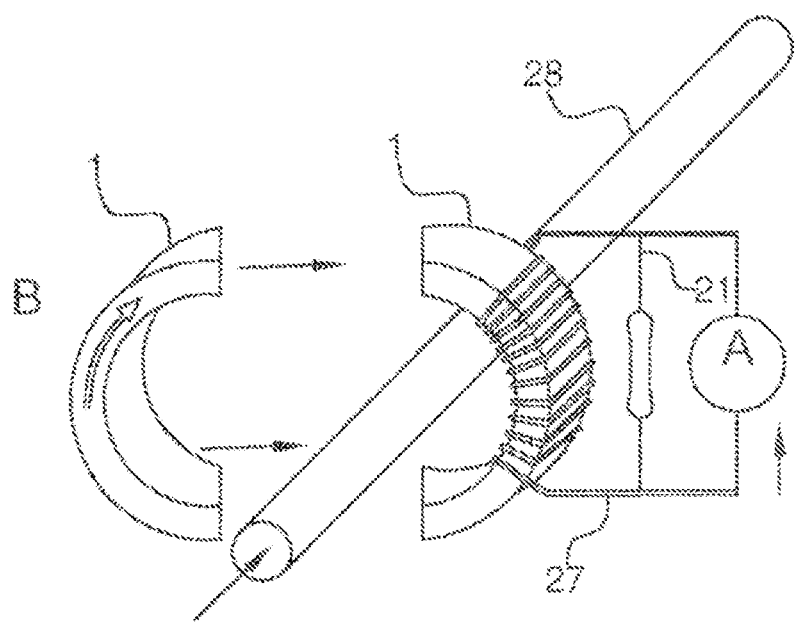
FIG. 8 is a diagram illustrating a split core CT, according to various embodiments.

FIG. 8 is a split core Current Transformer (CT). This allow the user to install the split core CT without having to disconnect the monitored power wires.

Figure 9:
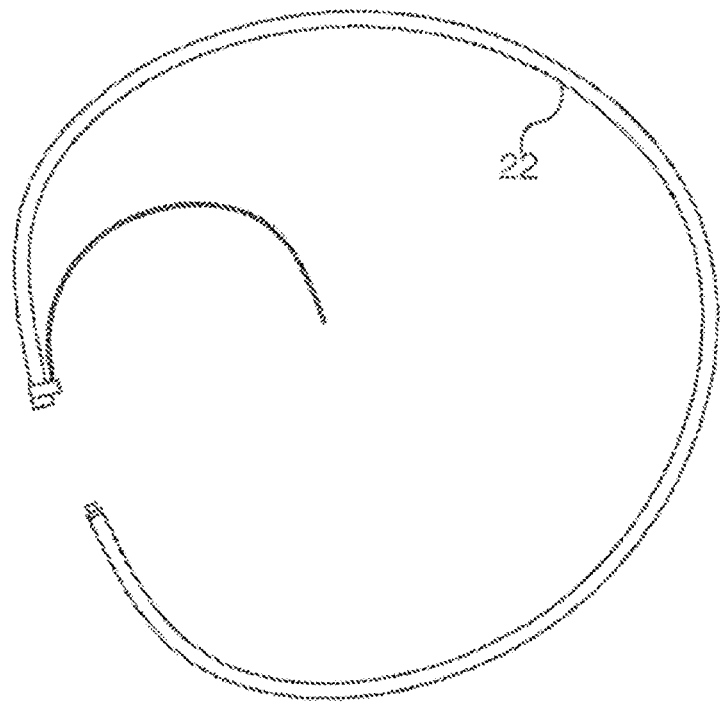
FIG. 9 illustrates a Rogowski coil, according to various embodiments.

FIG. 9 illustrates a Rogowski coil, named after Walter Rogowski, an electrical device for measuring alternating current or high-speed current pulses. It consists of helical coil of wire, with the lead from one end returning through the center of the coil to the other end, so that both terminals are at the same end of the coil.

Figure 10:
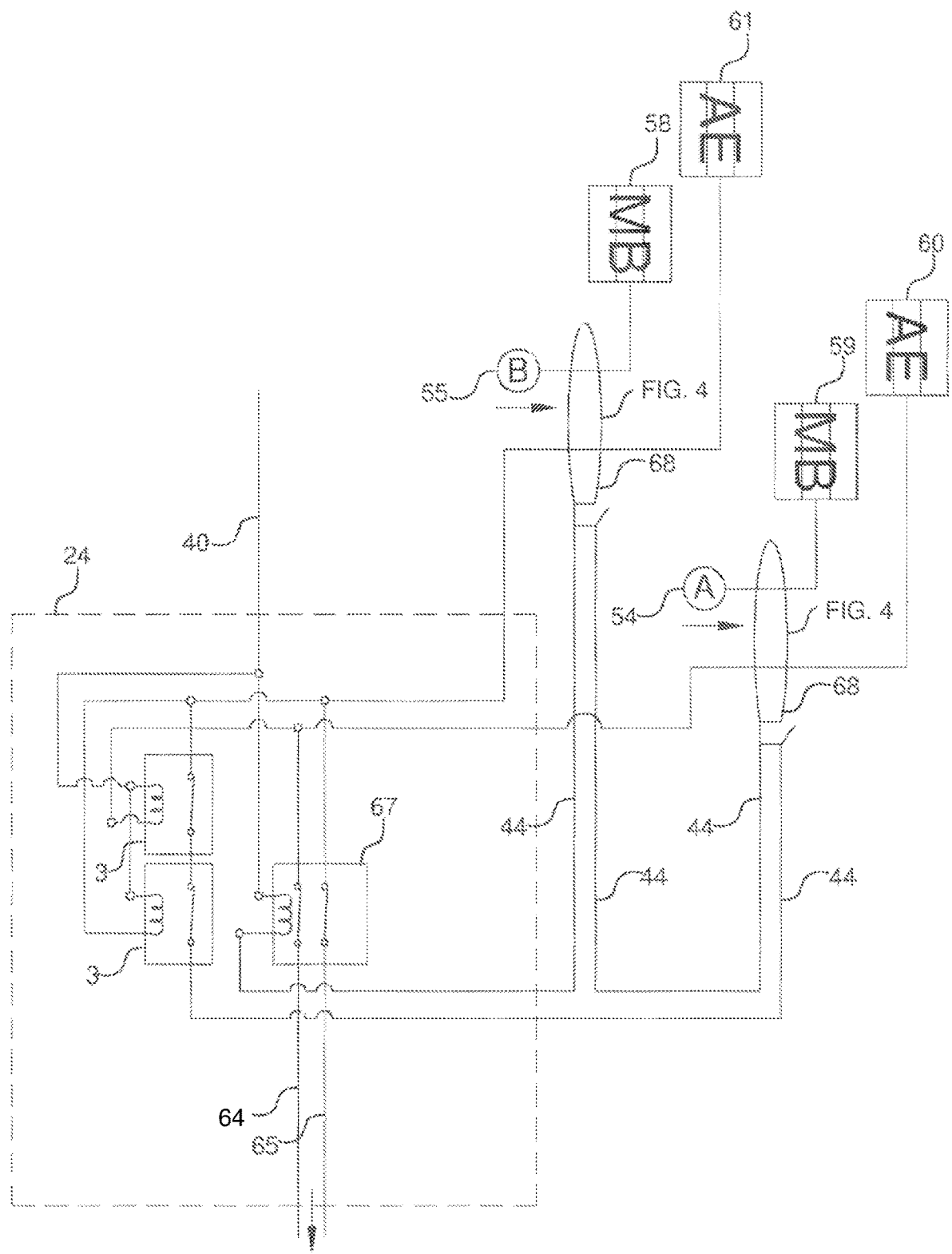
FIG. 10 is an electrical schematic diagram illustrating a single-phase analog approach, according to various embodiments described herein.

FIG. 10 shows an electrical schematic illustrating an analog approach to this invention. In this schematic, A phase and B phase power from both the utility and the connected alternative energy sources flow through CTs 68. The AE current flows to the (back-fed) alternative energy breaker 60, 61. With at least 0.1 amp flowing from the utility or AE through the CT 68 is enough to engage the relay, thus allowing power from the main service panel to flow through alternative energy breaker 60, 61 back through CT 68 to energize both relay coils 3. After power energizes all coils 3, both relays are engaged allowing B phase energy to flow through each relay (3) contacts, the power then flows through the contacts in CT 68 on the A phase first, then passing through CT 68 contacts on the B phase. Then 120 VAC power reaches double pole relay 67, energizing the relay, and engaging both contacts in relay 67 allowing power from A phase and B phase to interact with the present invention.

Fail-safe features include: 1) if either the A or B phase CT 68 output wires open or disconnected, the loop system collapses and the present invention isolates itself; 2) if either A phase or B phase voltage is lost, the loop system collapses opening the contacts of relay 67 and the present invention isolates itself.

Figure 11:
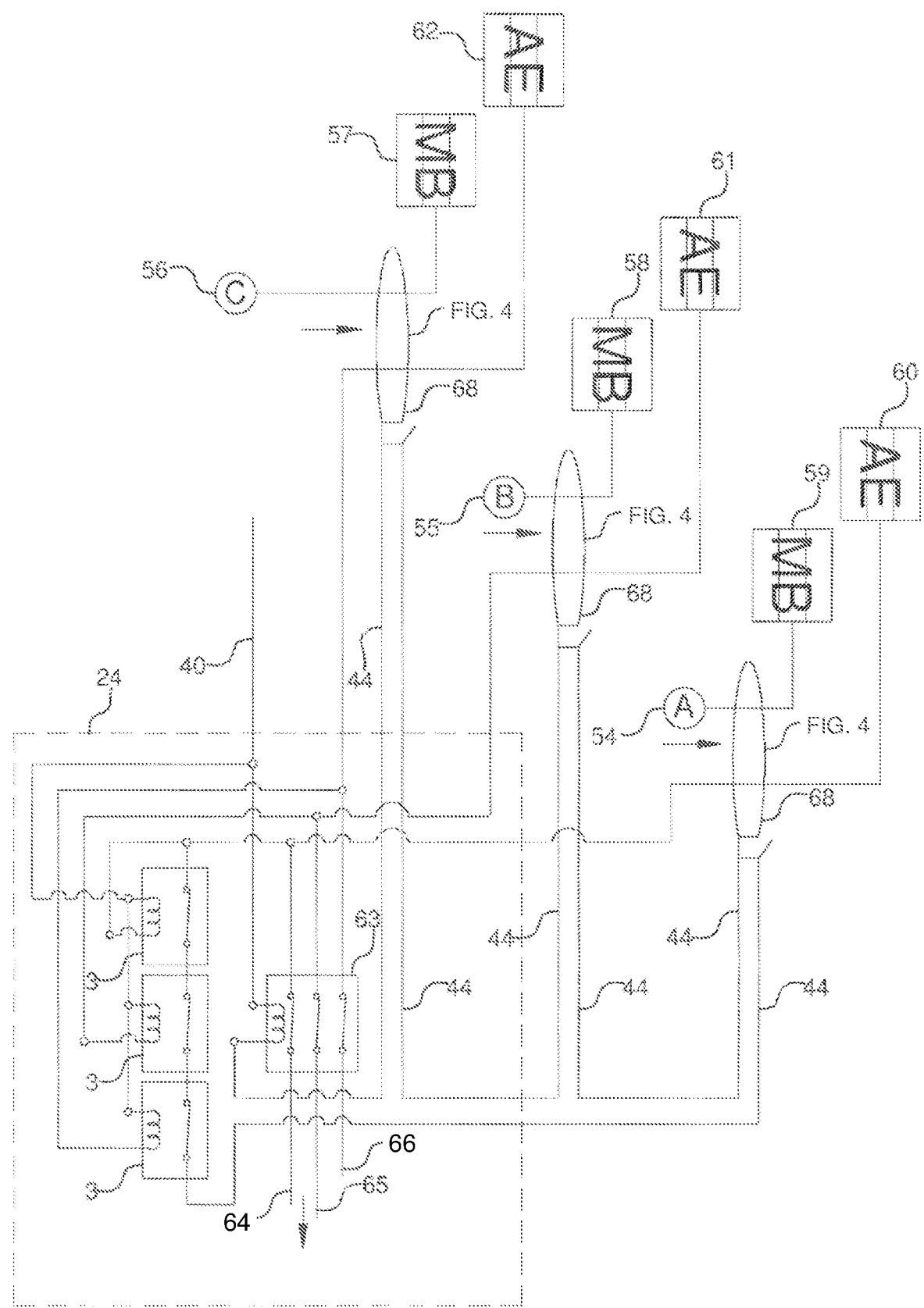
FIG. 11 is an electrical schematic diagram illustrating a three-phase analog approach, according to various embodiments described herein.

FIG. 11 is similar to FIG. 10, except it is a three-phase version. The present invention can be configured to work with all voltage variations, and any bus bar ampacity. Furthermore, the present invention can use any type of current sensor available, with the selection based on price. The present invention can also be made to be analog or digital, depending on the regulations dictated by the local electrical jurisdiction of the home.

Figure 12:
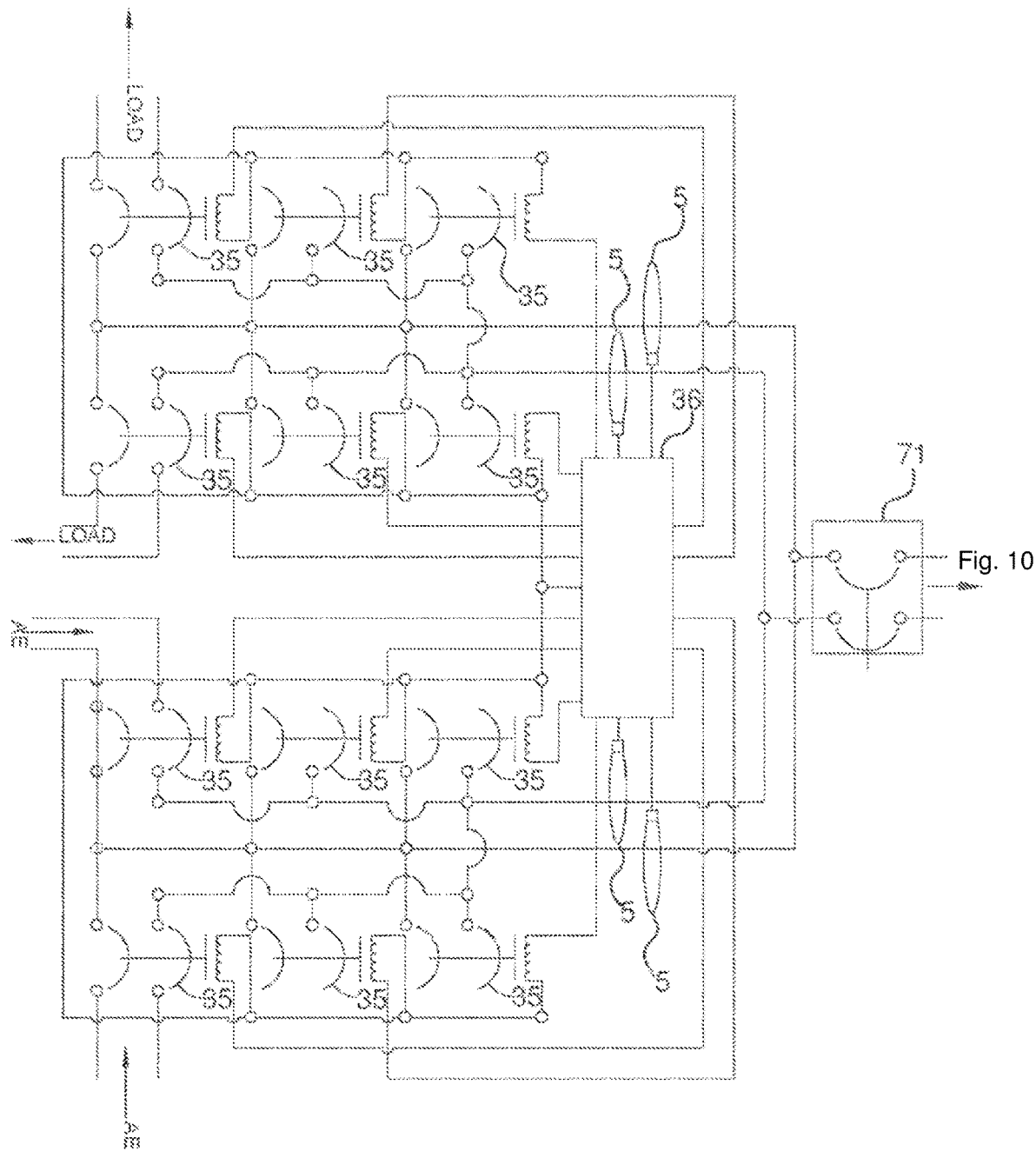
FIG. 12 is an electrical schematic diagram illustrating an automatic shutdown circuit, according to various embodiments.

FIG. 12 demonstrates an automatic shutdown, or ramp down approach when the present invention is "islanding", i.e. providing power to the building while electrically isolated from the grid, when utility power is down, or when the total allowable amperage for a given main service panel is exceeded.

In another embodiment of the present invention, if the grid goes down the present invention may isolate itself from the main service panel, allowing the alternative energy being produced to continue supplying the present invention with alternative energy. Additionally, the present invention can also shed loads to accommodate the amount of power being produced by the alternative energy sources. For example, if the AE production is at 5000 watts, and the loads connected use 6000 watts, the present invention can shut down individual loads in a predetermined fashion. This is either done digitally 36 through a logic chip or in an analog fashion.

FIGS. 13 through 18 represent different methods to monitor the current from the electrical grid.

Figure 13:
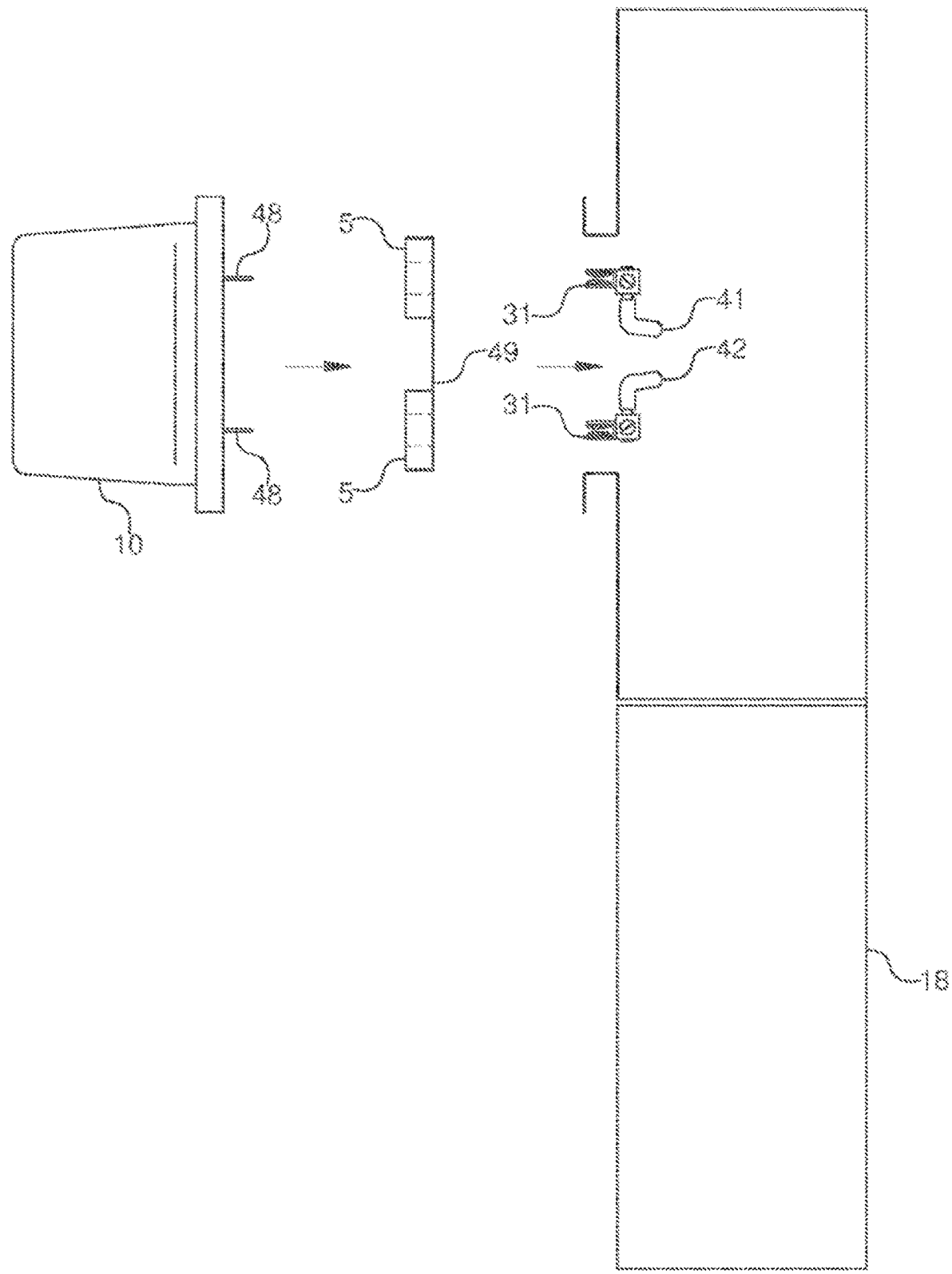
FIG. 13 a side view of a panel, CT and meter prior to plugging the meter into the panel, according to various embodiments.
Figure 14:
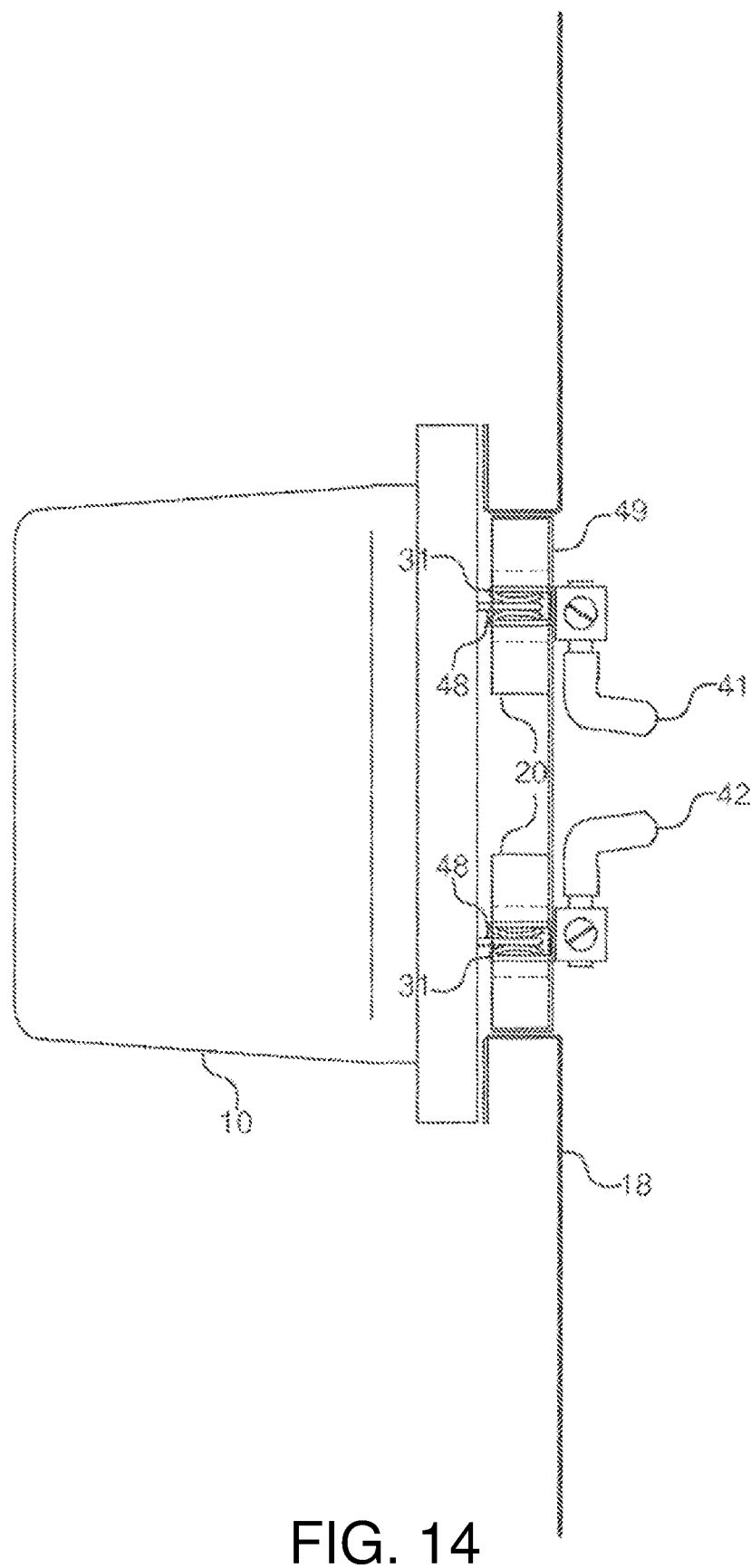
FIG. 14 is a side view of a panel, CT and meter after plugging the meter into the panel, according to various embodiments.

FIG. 13 illustrates how the wireless CT system is installed. The meter 10 is removed, then wireless apparatus system 5 is inserted behind the meter 10, allowing the present invention to measure the current without having to run wires from the existing main service panel to the present invention. FIG. 14 exhibits the complete system installed.

Figure 15:
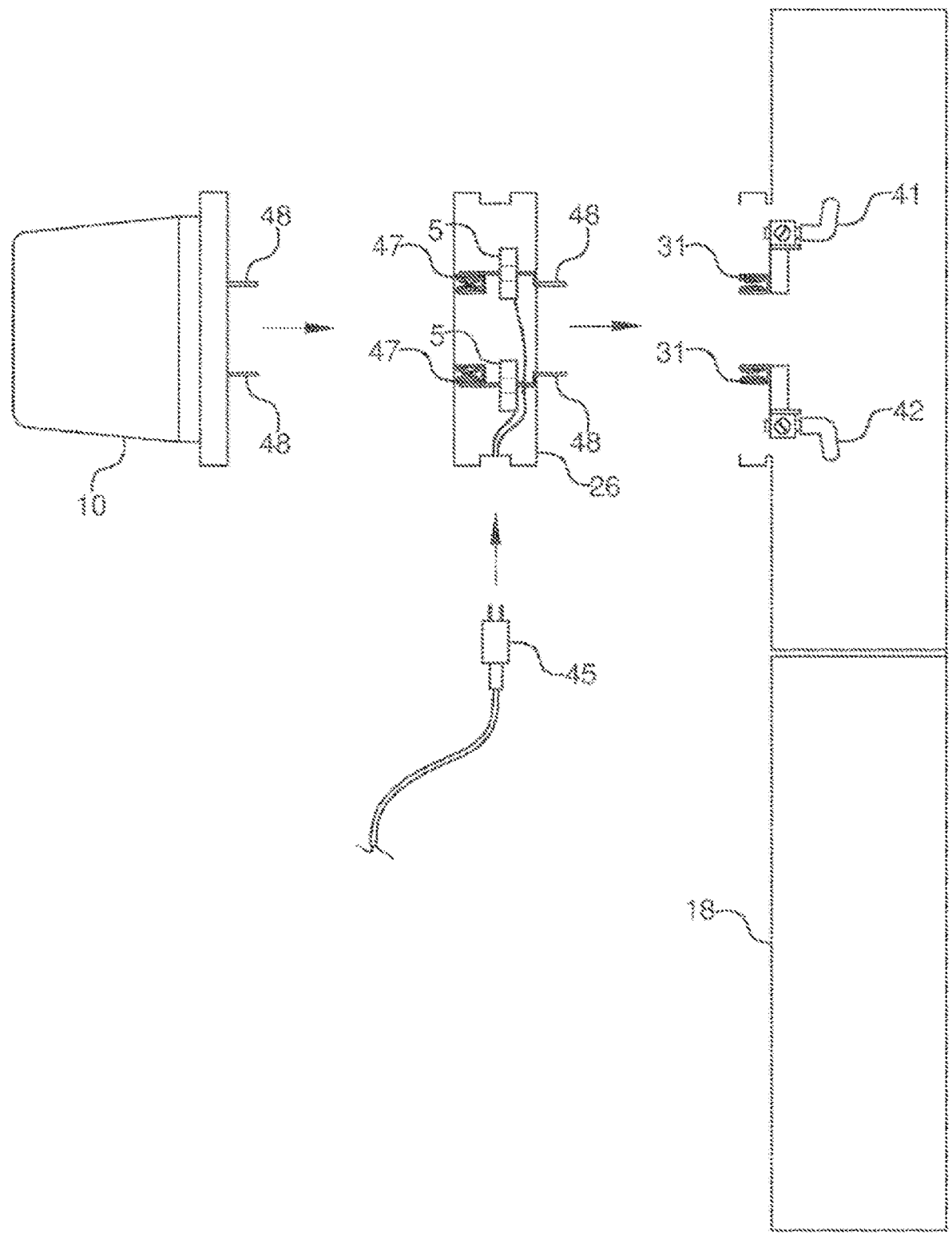
FIG. 15 a side view of a panel, an extended CT and meter prior to plugging the meter into the panel, according to various embodiments.

FIG. 15 demonstrates the removal of the meter 10 and insertion of a meter collar 26 (that includes integral CTs) by placing the collar prongs 48 into the meter socket 31, then reinserting the meter socket prongs 48 into the meter collar socket 47, and securing the meter and meter collar 26 to the existing enclosure in the normal manner.

Figure 16:
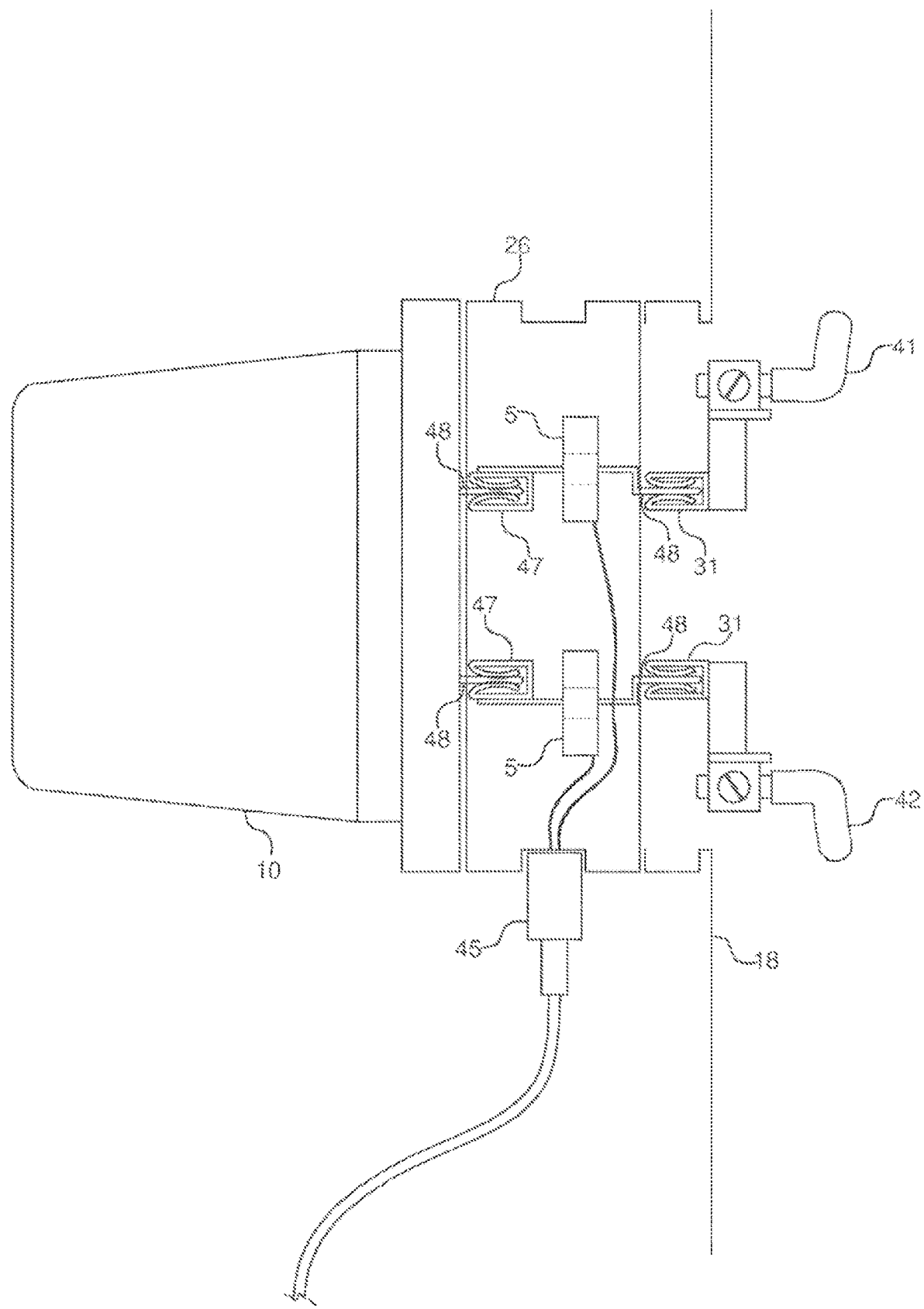
FIG. 16 a side view of a panel, an extended CT and meter after plugging the meter into the panel, according to various embodiments.

FIG. 16 shows a CT meter collar 26 with integral CTs. The meter collar 26 allows the installer to monitor the utility use or use it for the present invention. This allows the use of service panels that either do not have space for a CT, or are not allowed to have CTs installed in the panel in the local electrical jurisdiction.

Figure 17:
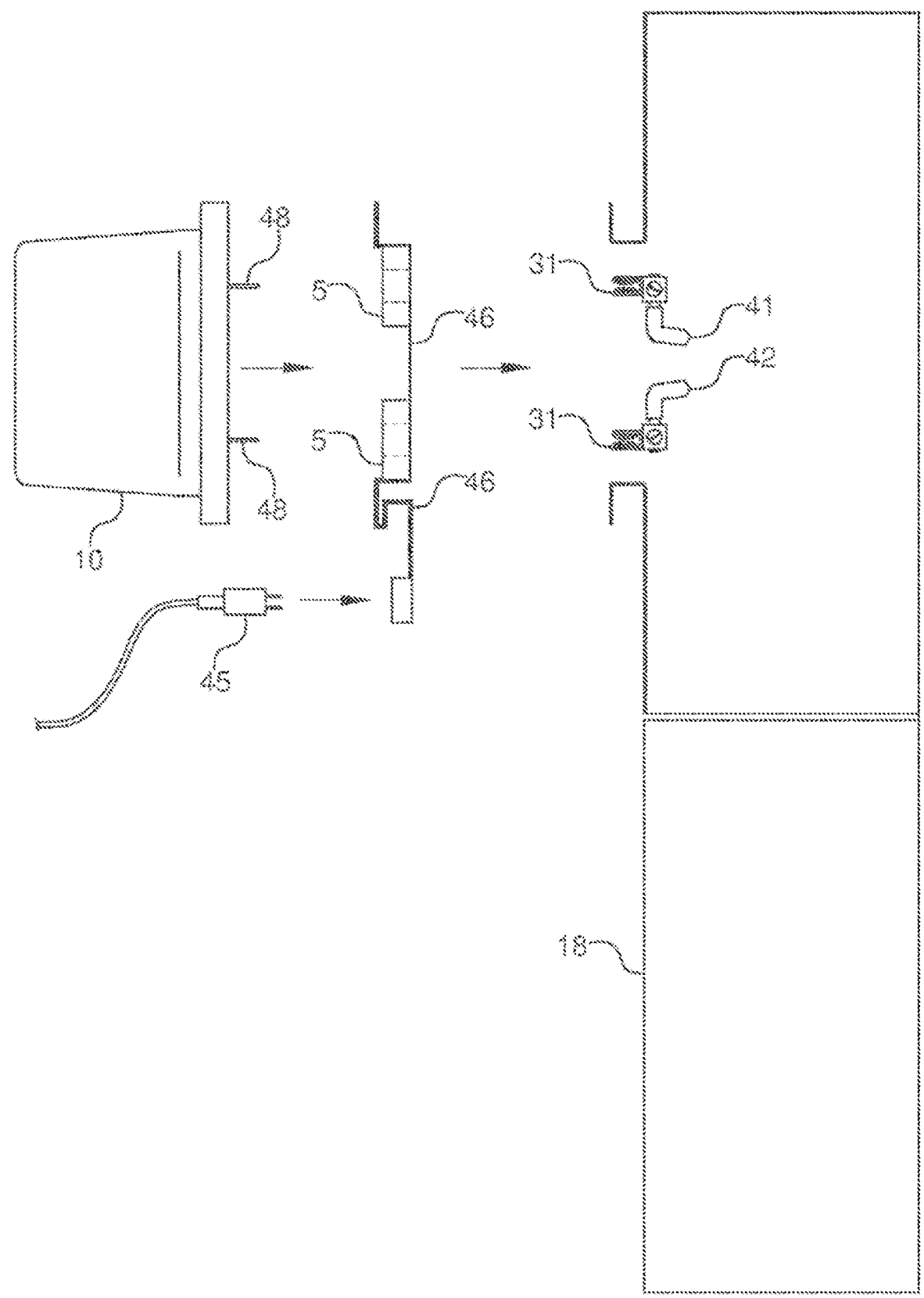
FIG. 17 a side view of a panel, another CT with and meter prior to plugging the meter into the panel, according to various embodiments.
Figure 18:
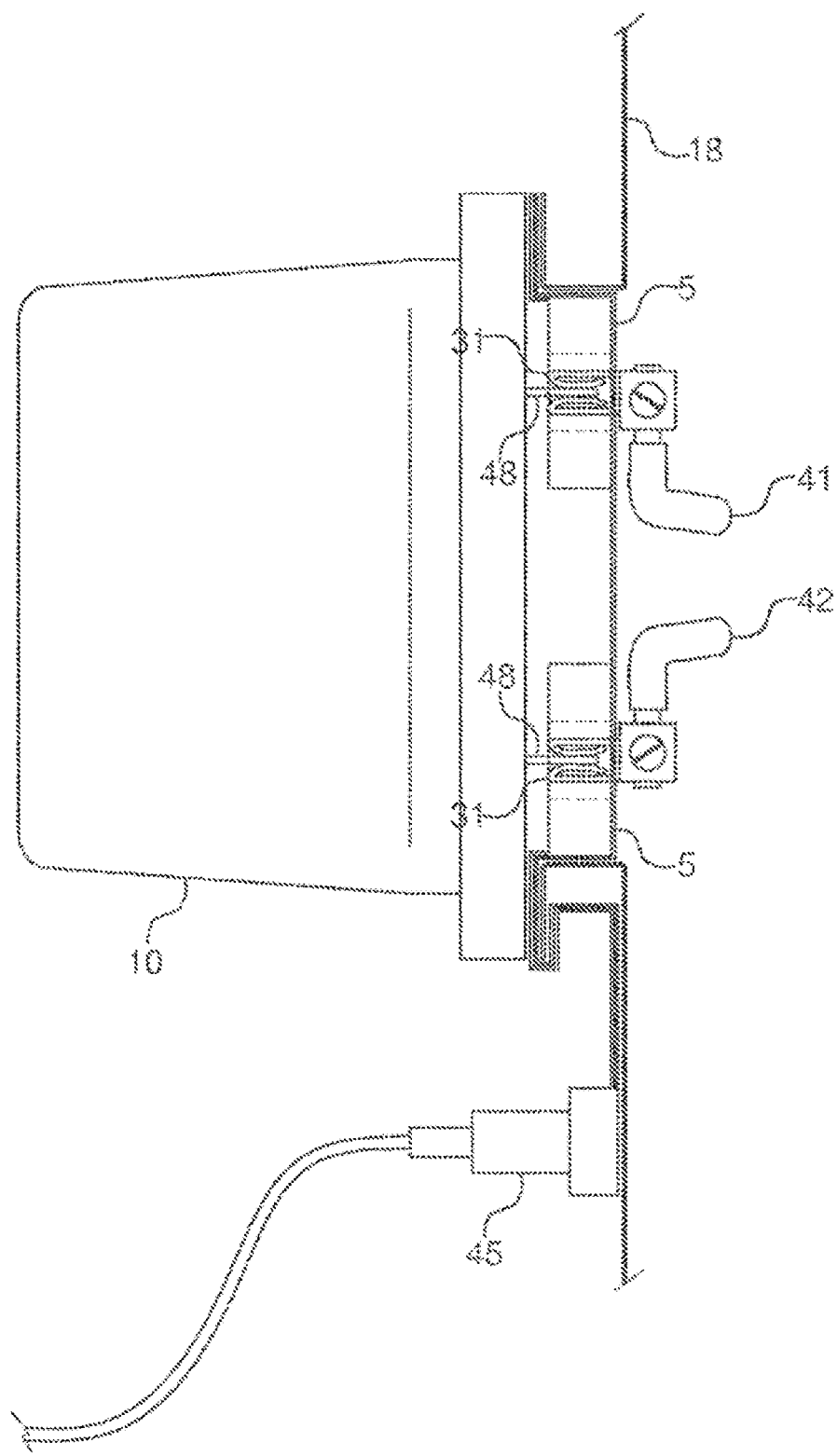
FIG. 18 a side view of a panel, another CT with and meter after plugging the meter into the panel, according to various embodiments.

In FIGS. 17 and 18 a thin flexible plastic is used so a meter collar is not required. The meter 10 is removed and the CT apparatus inserted into the meter area. This wraps around the existing main service panel meter ring. After inserting the apparatus behind the meter 10, the meter prongs 48 are inserted into the meter socket 31 and secured in the usual manner.

These approaches allow the new invention to monitor the use of all current being used through the main service panel, combined with the new invention, it can safely allow the addition of up to 100% of the service panel bus bar ampacity rating for back-feeding alternative energy, including battery backup or any type of grid tie energy as allowed by the 2020 NEC.

Figure 19:
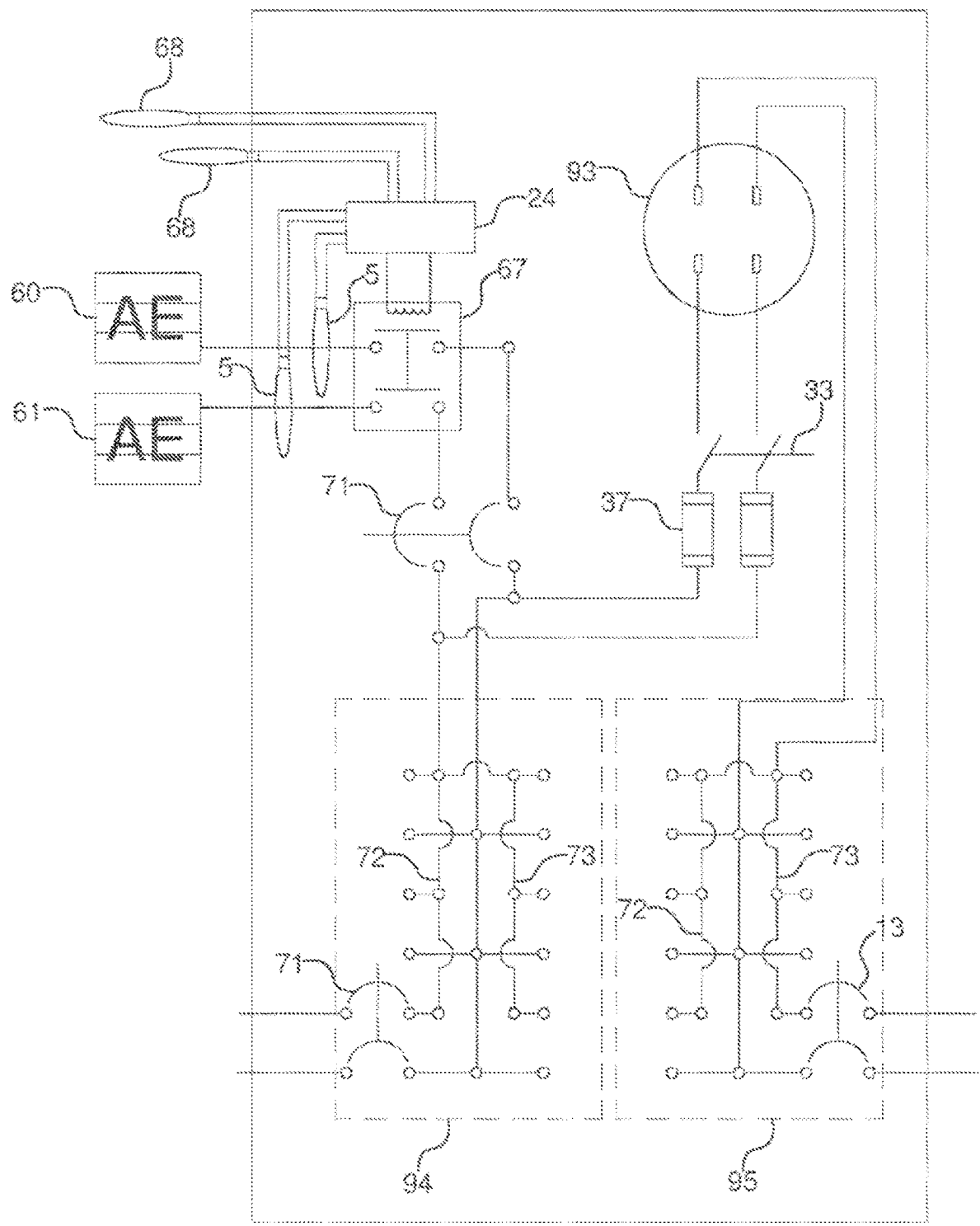
FIG. 19 is a front view of embodiments of a panel with a knife switch, according to various embodiments.

FIG. 19 depicts an embodiment of the present invention and allows various other configurations, depending on rules of the local electrical jurisdiction. In some jurisdictions of the United States the local codes call for a knife switch disconnect. In other jurisdictions, a fused switch is required, while other jurisdictions require a fused knife switch disconnect; and yet in other jurisdictions, a production meter is required with separate disconnect for the alternative energy sources. In this iteration, the present invention has two separate buses, one for production and one for consumption, and also has a fuse 37 with knife disconnect 33.

REFERENCE NUMBERS

1. Laminated Magnetic Core
2. Coil of Wire
3. Single pole Magnetic Relay (120 vac coil)
4. Shunt Trip Breaker
5. Current Transformer (CT)
6. Alternative energy (AE) Breaker
7. Main Service Panel Breaker
8. Low Voltage Magnetic Relay
9. Rectifier
10. Utility Meter
11. B-phase of the Electrical Panel Bus Bar
12. A-phase of the Electrical Panel Bus Bar
13. Two-pole Breaker used as Alternative Energy back feed Breaker
14. Common single pole breaker
15. Diode
16. Capacitor
17. XBox (Alternative Energy Exterior/sub-panel)
18. Existing Main Panel Breaker Box/Panel board
19. Common two-pole Breaker
20. Wireless Current Transformer (CT)
21. Burden Resistor
22. Rogowski Coil Flexible Current Transformer
23. Split Core Current Transformer
24. Controller (Power Control System)
25. Neutral Bussing
26. Meter collar with pre-installed (CT's)/or wireless
27. Mag Wire
28. Primary Current conductor
29. Secondary Current conductor
30. Magnetic Laminated Rod
31. Electric Utility Meter socket
32. Wireless Alternative energy production monitor
33. Knife Disconnect
34. Alternative energy production meter
35. Electronically Controlled Circuit Breaker
36. Programmable Sequence Operator
37. Fuse
38. A phase wire
39. B phase wire
40. Neutral wire
41. A phase wire in the main electrical panel
42. B phase wire in the main electrical panel
43. Current Transformer Relay
44. Wire from the CT's
45. Cord that plugs into CT assembly
46. Semi-flexible plastic material
47. Socket on the Meter Collar to except utility meter
48. Electrical power transfer prongs on meter, or meter collar
49. Wireless CT assembly that goes behind utility meter
50. Current Transformer Relay Contacts
51. Relay Spring
52. Relay Wire
53. Relay pivot plate
54. A phase from the utility meter
55. B phase from the utility meter
56. C phase from the utility meter
57. A phase going to main breaker in the main service panel
58. B phase going to main breaker in the main service panel
59. C phase going to main breaker in the main service panel
60. A phase AE going to the AE breaker in the main service panel
61. B phase AE going to the AE breaker in the main service panel
62. C phase AE going to the AE breaker in the main service panel
63. 3 pole Relay (120 vac coil)
64. A phase from AE from the Xbox
65. B phase from AE from the Xbox
66. C phase from AE from the Xbox
67. Double Pole Magnetic Relay (120 vac coil)
68. CT's (Current Transformer) in the Main Service Panel
69. First pivot point on a dual pivot relay
70. Second pivot point on a dual pivot relay
71. Double pole Breaker (for building loads)
72. A phase Bus Bar in the XBox
73. B phase Bus Bar in the XBox
74. Present Invention (Xbox)
75. Electronically/Electrically controlled circuit breakers for load
76. Electronically/Electrically Controlled Circuit breakers— for back-feeding power to the bus bars
77. Current Amplifier
78. Current Sensor
79. Signal Amplifier
80. Non-Contact Voltage Sensor
81. Logic-Base Chip
82. Master Logic-Base Chip
93. Alternative Energy Production Meter
94. Load side Busing in the Xbox
95. Alternative Energy (Back-Feed) side of Busing in the Xbox
96. A micro-inverter or oscillator is used with a small battery, or large capacitor to simulate the grid

What is claimed is:

1. An apparatus comprising:
an enclosure;
bus bars in the enclosure;
an electrical isolation device comprising contacts wired to connect and disconnect the bus bars from conductors connected to a branch circuit of a main electrical service panel, the enclosure separate from the main panel;
two or more overcurrent protection devices in the enclosure connected to the bus bars, wherein:
one or more of the two or more overcurrent protection devices are configured to connect to one or more alternative energy sources; and one or more of the two or more overcurrent protection devices are configured to each connect to a load;

one or more current sensors configured to monitor current to the main electrical service panel and to monitor current from the one or more alternative energy sources; and a power control system configured to:
using an output of the one or more current sensors, sum the current to the main electrical service panel and the current from the one or more alternative energy sources, wherein the sum comprises an amount of current feeding bus bars of the main electrical service panel; and open the electrical isolation device in response to the sum of the current to the main electrical service panel and the current from the one or more alternative energy sources from the output of the one or more current sensors exceeds a current limit associated with a rating of the main electrical service panel.

2. The apparatus of claim 1, wherein:
the one or more alternative energy sources comprises two or more alternative energy sources;
the one or more overcurrent protection devices are electrically operable; and
the power control system further comprises a programmable sequence operator configured to disconnect one or more of the two or more alternative energy sources in a predetermined sequence.

3. The apparatus of claim 2, wherein the power control system disconnects one or more of the two or more alternative energy sources in sequence prior to opening the electrical isolation device.

4. The apparatus of claim 1, further comprising one or more voltage monitoring probes connected to conductors feeding the main electrical service panel and wherein the power control system is further configured to open the electrical isolation device in response to:
determining that voltage on one or more phases feeding the main panel is below a voltage threshold; and/or
one or more bus bars feeding the main electrical service panel is disconnected.

5. The apparatus of claim 1, wherein current sensors of the one or more current sensors monitoring current to the main electrical service panel and/or one or more voltage monitoring probes comprise a meter collar configured to fit between a utility meter ahead of the main electrical service panel and a socket for the utility meter.

6. The apparatus of claim 5, wherein the meter collar is configured to allow prongs of the meter to fit into corresponding receptacles in the socket.

7. The apparatus of claim 5, wherein prongs of the utility meter fit in receptacles of the meter collar and prongs of the meter collar fit into receptacles of the socket.

8. The apparatus of claim 1, further comprising a main circuit breaker in the enclosure that electrically isolates bus bars of the enclosure from a connection to a main electrical service panel.

9. The apparatus of claim 8, wherein the main circuit breaker is an electronically operated circuit breaker and wherein the electronically operated main circuit breaker comprises the electrical isolation device.

10. The apparatus of claim 1, wherein the branch circuit of the main electrical service panel comprises a circuit breaker sized smaller than a main overcurrent protection device of the main electrical service panel.

11. The apparatus of claim 1, wherein the power control system comprises a programmable controller.

12. The apparatus as in any of claims 1-11, wherein the one or more current sensors configured to monitor current to the main electrical service panel are wireless current sensors in communication with the power control system.

13. The apparatus as in any of claims 1-11, wherein the one or more current sensors configured to monitor current to the main electrical service panel and to monitor current from the one or more alternative energy sources comprise one of:
current sensors with conductors feeding the main electrical service panel and conductors feeding the one or more alternative energy sources; and
one or more current sensors monitoring current to the main electrical service panel and one or more current sensors monitoring current from the one or more alternative energy sources.

14. The apparatus as in any of claims 1-11, further comprising an oscillator circuit energized by a battery source, wherein the power control system is coupled with each of the one or more alternative energy sources and provides a signal from the oscillator circuit in response to the electrical isolation device being in an open position.

15. The apparatus of claim 1, wherein the one or more overcurrent protection device connected to the one more alternative energy sources and/or the loads, and wherein the power control system further comprises a graphical user interface configured to allow a user to monitor and control one or more of the electrical isolation device, a main circuit breaker connected to the bus bars of the enclosure, and/or one or more electrically operated circuit breakers.

* * * * *